United States Patent [19]

Kim

[11] Patent Number: 5,216,072
[45] Date of Patent: Jun. 1, 1993

[54] PROCESS FOR DIRECT ADDITION OF ACID TO POLYMERS

[75] Inventor: Young H. Kim, Wilmington, Del.

[73] Assignee: E. I. Du Pont de Nemours and Company, Wilmington, Del.

[21] Appl. No.: 511,181

[22] Filed: Apr. 17, 1990

[51] Int. Cl.$^5$ ............................................. C08F 8/00
[52] U.S. Cl. ................................. 525/60; 525/332.8; 525/332.9; 525/333.1; 525/333.2; 525/359.3; 525/383; 560/190; 560/204
[58] Field of Search ............... 525/332.8, 332.9, 333.1, 525/333.2, 60; 560/190, 204

[56] References Cited

U.S. PATENT DOCUMENTS

| | | | |
|---|---|---|---|
| 2,067,706 | 1/1937 | Eikentscher | 525/60 |
| 2,232,791 | 2/1941 | Ladd et al. | |
| 2,405,983 | 8/1946 | Sharkey et al. | 525/60 |
| 3,523,108 | 8/1970 | Boutsicaris et al. | 260/85.1 |
| 3,595,851 | 7/1971 | Boutsicaris et al. | 260/94.7 |
| 4,129,699 | 12/1978 | Adams et al. | 526/42 |
| 4,704,427 | 11/1987 | Kitahara et al. | 524/531 |

FOREIGN PATENT DOCUMENTS 54-60525 11/1980 Japan .
776073 5/1957 United Kingdom .

OTHER PUBLICATIONS

Bihovsky, R. et al., J. Org. Chem., vol. 54, pp. 4291-4293 (1989).
Buchan, G. M. et al., Polymer, vol. 19, pp. 1089-1093 (Sep. 1978).
Schulz, D. N. et al., Rubber Chem. Technol., vol. 55, No. 3, pp. 809-859 (1982).
Morton, M., Anionic Polymerization:Principles and Practice, Chapter 9, pp. 179-220 Academic Press (1983).
Long, T. E. et al., J. Polymer Science: Part A: Polymer Chemistry, vol. 27, pp. 4001-4012 (1989).
Chung, T. C., J. Polymer Science, Part A: Polymer Chemistry, vol. 27, pp. 3251-3261 (1989).
D'ianni, J. D. et al., Industrial and Engineering Chemistry, vol. 36, No. 11, pp. 1171-1181 (Nov. 1946).
Buchan, G. M. et al., J. Chem. Soc. Perkin Trans. I, pp. 783-788 (1978).
Buchan, G. M. et al., Markromol Chem., vol. 179, pp. 1409-1417 (1978).

Primary Examiner—Bernard Lipman

[57] ABSTRACT

A process comprising the direct addition of a halogenated carboxylic acid to an olefin-containing compound is disclosed, as well as the resulting adduct and saponified adduct.

19 Claims, No Drawings

PROCESS FOR DIRECT ADDITION OF ACID TO POLYMERS

FIELD OF THE INVENTION

This invention relates to a process for the direct uncatalyzed addition of a halogenated $C_1$ to $C_5$ carboxylic acid having a pKa of less than 2.5 to an olefinic noncyclic compound containing a $-C=C(R^1)-$ group wherein $R^1$ is alkyl or cyclic alkyl, and to the resulting novel adducts and their saponification products.

BACKGROUND OF THE INVENTION

The chemical modification of polymers is a commonly known means of altering and optimizing the physical and mechanical properties of such compounds. Chemical reactions on unsaturated polymers are of particular interest because of the technological importance of the parent materials and the reactivity of the available double bonds. Addition reactions to the olefinic bonds of polymers are well known in the art.

U.S. Pat. No. 4,704,427 of Kitahara et al., issued Nov. 3, 1987, discloses that a polymer or copolymer containing $-C(CH_3)=C-$ bonds can be modified by reaction using a Lewis acid catalyst and a co-catalytic amount of a cationic polymerization catalyst having active hydrogen or halogen. The cationic polymerization catalysts include trichloroacetic acid, tribromoacetic acid, water plus methyl alcohol, 2,4-dinitrophenol, p-nitrophenol, t-butylchloride, triphenylmethane chloride or benzyl chloride. The preparation of an adduct is not disclosed.

U.S. Pat. No. 3,523,108 of Boutsicaris et al., issued Aug. 4, 1970, discloses a process for esterifying polymers having repeating units derived from butadiene by reaction with a mixture of sulfuric acid with saturated aliphatic or aromatic carboxylic acid. The reaction involves the addition of acetic acid to a double bond of the polymer to form pendant acetate ester groups.

U.S. Pat. No. 3,595,851 of Boutsicaris et al., issued Jul. 27, 1971, discloses the peroxide curing of hydroxy and acyloxy derivatives of butadiene liquid polymers Japan 54-60525 of Ikeda, published Nov. 28, 1980, discloses a method for preparation of aromatic ether derivatives of unsaturated polymers by reacting aromatic hydroxy compounds or naphthols with the unsaturated polymer in the presence of a catalyst. Also disclosed is an addition product of a phenol with polydienes, but it is taught that isoprene homopolymers do not react.

All of the above disclose modification reactions involving use of a suitable catalyst. None teach the direct addition of halogenated carboxylic acids to olefinic polymers.

T. C. Chung disclosed at J. Polym. Science: Part A 27, 3251 (1989), preparation of diblock copolymers containing butadiene or isoprene and hydroxyl ethyl vinyl moiety. These polymers were prepared from polydiene by hydroboration followed by oxidation. The hydroxyl group of these polymers is all primary hydroxyl group.

It is therefore an object of the present invention to provide a process for the direct addition without use of a catalyst of halogenated carboxylic acids to the unsaturated bonds of olefinic polymers.

It is a further object of the present invention to provide novel polymer adducts resulting from this addition reaction.

It is a further object of the present invention to provide novel polymers resulting from the saponification of the addition reaction polymer adducts.

It is also an object of the present invention to provide block or random copolymers incorporating the above novel products of the addition or saponification reactions.

SUMMARY OF THE INVENTION

This invention comprises a process for the direct uncatalyzed addition of a halogenated $C_1$ to $C_5$ carboxylic acid having a pKa of less than 2.5 to an olefinic noncyclic compound containing a $-C=C(R^1)-$ group wherein $R^1$ is alkyl or cyclic alkyl.

This invention further comprises the adduct resulting from the above process having the following repeating unit of formula (II):

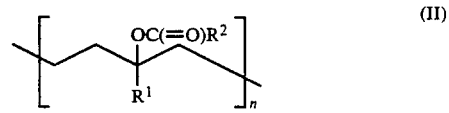

wherein
$R^1$ is alkyl or cyclic alkyl;
$R^2$ is $C_1$ to $C_4$ haloalkyl; and
n is two or more.

This invention further comprises a block or random copolymer comprising repeating units of formula (II) and at least one of polyethylene, polybutadiene, polystyrene, polyacrylate, or polymethacrylate.

This invention further comprises a compound resulting from the saponification of a compound of formula (II) or of a copolymer thereof.

This invention also comprises a block or random copolymer comprising repeating units of saponified formula (II), or saponified copolymers thereof, with polybutadiene, polyethylene, polyisoprene, polystyrene, polymethacrylic acid, or polyacrylic acid.

DETAILED DESCRIPTION OF THE INVENTION

The process of the present invention comprises a direct addition process for adding a halogenated carboxylic acid to a noncyclic compound containing a $-C=C(R^1)-$ group wherein $R^1$ is alkyl or cyclic alkyl. This addition reaction takes place without the aid of any catalyst to yield novel adduct products.

Compounds suitable for use as reactants in the process of the present invention are those containing a $-C=C(R^1)-$ olefinic bond. Such compounds include those having the following repeating unit of formula (I):

wherein:
$R^1$ is alkyl or cyclic alkyl; and
n is two or more.

Such compounds include a homopolymer of a conjugated diene, a copolymer of at least one conjugated diene and at least one other monomer, or a polyolefin. Examples of such appropriate polymers include polyisoprene, or block or random copolymers thereof. Naturally occurring cis and trans polyisoprene could be used. However, synthetic polymers prepared by conventional well known polymerization methods could be used as well. In particular, block copolymers with non-reacting monomer units can be best prepared by living polymerization according to the methods of M. Morton, "Anionic Polymerization: Principles and Practice", Chapter 9, Academic Press, New York, N.Y. (1983) or T. E. Long et al., J. Polymer Science, Part A, Vol. 27, p. 4001 (1989). Alternatively, coupling of different polymers which have reactive functional groups can be used. In preferred reactants, $R^1$ is $C_1$ to $C_6$ alkyl or cyclic alkyl.

When a copolymer is being synthesized, isolation of the copolymer product is not necessary prior to reaction with the carboxylic acid in the addition reaction, unless the polymerization solvent is incompatible with the acid addition reaction. The polymerization reaction can be followed immediately by the addition reaction and then by saponification to generate a vinyl alcohol-containing polymer.

The success of the addition reaction in polymers can be followed readily by observing the nuclear magnetic resonance spectra of the product. For example in polyisoprene (PIP) the disappearance of a peak at about 5.1 ppm in proton nuclear magnetic resonance can be observed. The carbon NMR shows a peak at 92 ppm which is responsible for the acetylated tertiary carbon, in addition to the disappearance of all PIP peaks and appearance of new peaks which can be assigned to the new modified polymer structure. Upon saponification this peak moves to 72.9 ppm and is due to the hydroxylated tertiary carbon. No degradation of the polymer chain has been found. GPC analysis shows that the modified polymer has a molecular dispersity almost the same as the untreated polymer, and gains molecular weight as expected by addition of hydroxyl group.

Halogenated carboxylic acids suitable for use in the process of the present invention include $C_1$ to $C_5$ carboxylic acids having a pKa of less than 2.5. Especially suitable for use herein are halogenated acetic acids such as dichloroacetic acid, trichloroacetic acid, difluoroacetic acid, or trifluoroacetic acid. Preferred for use herein are dichloro-, trichloro- or trifluoroacetic acids.

The process of the present invention can be conducted in any solvent which is non-reactive under the conditions used in the reaction. In general aliphatic hydrocarbons or halocarbons are suitable. Examples of such suitable solvents include hexane, toluene, dichloroethane and like solvents. The solvent is preferably free of water and oxygen.

In the addition reaction of the present invention, it is necessary to operate with at least 0.1 mole of acid per olefinic bond of reactant. Typically 1 to 3 moles of acid per olefinic bond is used, and it is preferred to operate within this range. The maximum mole ratio of acid to solvent that can be employed is 1:2 acid:solvent.

Use of an appropriate reaction temperature is important. The reaction temperature range is from about 0° C. to about 80° C. When the reaction is carried out under the refluxing temperature of toluene, or at a temperature higher than 80° C., the fast disappearance of the double bond can be shown by proton nuclear magnetic resonance, but a peak corresponding to the acetylated tertiary group is not found in carbon NMR. Very little addition occurs above about 80° C. and it is speculated that most of the double bond has cyclized. Preferably the addition reaction is conducted at a temperature of from about 0° C. to about 25° C. The reaction is carried out under atmospheric pressure.

It is preferred to carry out the addition reaction in an inert atmosphere, such as nitrogen or other suitable gases. Also preferable is to conduct the reaction with constant stirring or agitation.

The addition reaction of the present invention is highly selective. The acid reactant is added at the alkyl substituted double bond. Within this bond, the reaction is selective for the carbon atom bearing the substituent. For example, trifluoroacetic acid was found to add to the 1,2 double bond of isoprene when reacted in toluene at 0° C. If the acid concentration is high, or the reaction temperature is above 0° C., oligomerization of isoprene is predominant.

Similarly, a high yield of selective addition of trifluoroacetic acid to the exo double bond of carvone can be achieved according to the following reaction.

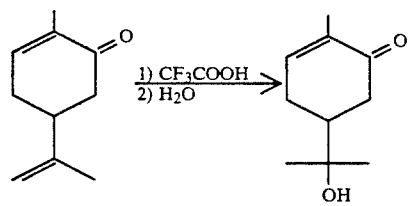

A further aspect of the present invention is the novel adduct resulting from the acid addition reaction. This compound comprises the following repeating unit of formula (II):

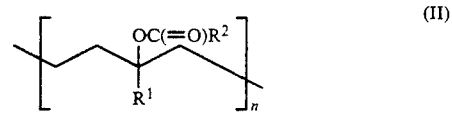

wherein:
$R^1$ is alkyl or cyclic alkyl;
$R^2$ is $C_1$ to $C_4$ haloalkyl; and
n is two or more.

Preferred compounds of formula (II) include those wherein $R^2$ is a chloromethyl or fluoromethyl group, such as poly(ethylene-a-α-haloacetoxy-β-propene). The isolated trifluorinated acetic acid added polymer started to show some decomposition at room temperature in a few weeks, but the adduct with chlorinated acetic acid showed no apparent decomposition at room temperature over a period of six months.

The adducts of formula (II) have utility as intermediates in the preparation of block or random copolymers containing units of formula (II), and in the preparation of polymers resulting from the saponification of compounds of formula (II) or block or random copolymers thereof.

The adducts of formula (II) can be incorporated into block or random copolymers by methods known in the art. See M. Morton, "Anionic Polymerization: Principles and Practice", Chapter 9, Academic Press, New York, N.Y. (1983) or T. E. Long et al., J. Polymer Science, Part A, Vol. 27, p. 4001 (1989). Thus another aspect of the present invention is a block or random copolymer comprising repeating units of a polymer of formula (II) and at least one other monomer or polymer unit. Other suitable monomers or polymers for combination with units of formula (II) include polyethylene, polybutadiene, polystyrene, polyacrylate, polymethacrylate, or monomers thereof, and similar such polymers.

prene by selectively hydroxylating the polyisoprene segments according to the following reaction sequence.

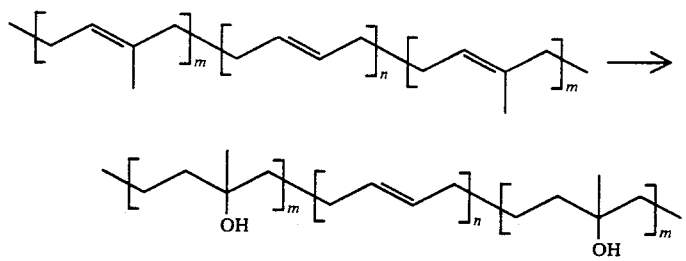

Examples of such block or random copolymers include polybutadiene-b-poly(ethylene-a-α-trifluoroacetoxy-β-propene); polybutadiene-r-poly(ethylene-a-α-trifluoroacetoxy-β-propene); poly(ethylene-a-α-trifluoroacetoxy-β-propene)-b-polyacrylic acid, and the like. Such block or random copolymers are useful as emulsifiers, surface active agents, rubber toughening agents or other uses known to those skilled in the art.

The adduct compounds resulting from the acid addition reaction, as well as block or random copolymers containing units of formula (II), can undergo saponification to provide the corresponding hydroxy-containing compounds. The saponification reaction can be conducted in an aqueous solvent for homopolymes of low molecular weight. For higher molecular weight polymers, the saponification can be conducted by basic methanolysis as known in the art. See U.S. Pat. No. 3,595,851, Preferably, saponification is conducted in the presence of methyl alcohol and sodium emthoxide or potassium hydroxide.

Therefore a further aspect of the present invention is a hydroxy-containing compound prepared by the saponification of a compound containing one or more units of formula (II). Such compounds will contain repeating units at points corresponding to the occurrence of units of formula (II) of poly(ethylene-a-α-methyl vinyl alcohol). Preferred polymers of this type are those having regularly alternating units of poly-(ethylene-a-α-methyl vinyl alcohol).

These saponified compounds can also be incorporated into block or random copolymers. A further respect of the present invention is a block or random copolymer comprising units of poly(ethylene-a-α-methyl vinyl alcohol) with other suitable monomeric or polymeric units. Examples of other suitable monomer or polymer units include polybutadiene, polyethylene, poyisoprene, polystyrene, polyacrylic acid and the like, or monomers thereof. Such block or random copolymers are prepared by methods known to those skilled in the art according to the methods of Morton or long et al, previously cited.

Examples of such block or random copolymers include polybutadiene-b-poly(ethylene-a-α-methyl vinyl alcohol; polyethylene-b-poly(ethylene-a-α-methyl vinyl alcohol; polyethylene-r-poly(ethylene-a-α-methyl vinyl alcohol; poly(ethylene-a-α-methyl vinyl alcohol)-b-polyacrylic acid; and similar polymers.

Block copolymers having particular properties can be prepared using the addition process of the present invention followed by saponification. For example, a novel thermoplastic elastomer, a further aspect of the present invention, can be generated from the triblock copolymer of polyisoprene-b-polybutadiene-b-polyiso- prene by selectively hydroxylating the polyisoprene segments according to the following reaction sequence.

Since the glass transition temperature of the hydroxylated segment is around 45° to 70° C., and that of butadiene is −70° C., a thermoplastic elastomer having desirable properties is obtained, i.e., poly(ethylene-a-α-methyl vinyl alcohol)-b-polybutadiene-b-poly(ethylene-a-α-methyl vinyl alcohol). It has been found that the homo-hydroxylated polyisoprene has better oxygen barrier properties than polypropene, as well as better water barrier properties than polyvinyl alcohol. Due to its combination of oxygen and water barrier properties, this polymer can be useful in various multilayer packaging applications. Some of the di- or tri- block copolymers of poly(ethylene-a-α-methyl vinyl alcohol) also form about a 5 nanometer or more thick monolayer at the water/air interface which could be deposited readily into a silicon wafer. These uniform thin polymer coatings could be useful for high resolution microlithography.

Both the saponification products and the block or random copolymers containing units thereof have many uses as is known in the art. Examples of such uses include as emulsifiers, surface active agents, or rubber toughening agents.

The following examples represent aspects of the present invention but are not intended to limit it in any way. All acid addition reactions were conducted under nitrogen atmosphere unless otherwise noted. The following abbreviations are used: NMR, nuclear magnetic resonance spectrum; IR, infrared spectrum; DSC., differential scanning calorimetry; Tg, glass transition temperature; TGA, thermogravimetric analysis; GPC., gel permeation chromatography.

EXAMPLE 1

Preparation of poly(ethylene-a-α-methyl vinyl alcohol) from cis-polyisoprene with trifluoroacetic acid followed by saponification To 1350 ml of dry toluene was added 102 g of synthetic cis-polyisoprene ($M_n$=39,900, D=6.9 by GPC with PMNA (polymethylmethacrylate) standard) and stirred overnight, with occasional heat, to dissolve into a homogeneous solution. To this was added 228 g of trifluoroacetic acid over period of 3 hr via a syringe at room temperature. The color of the solution turned light purple, then to light brown. The mixture was stirred overnight. To this was added 300 ml of methanol, which eliminated coloration, followed by 250 g of sodium methoxide. The mixture was stirred for 2 hr, then 140 ml of acetic acid and 150 ml of methanol were added to stop the reaction. The polymer was found to settle down at this stage. The supernant was decanted off and the polymer was washed with methanol (twice with 500 ml), and 50% methanol in water (twice with 1000 ml). The washed polymer was dissolved in a mixture of methanol and methylene chloride (5:95), and then filtered through a sintered glass filter. The polymer was precipitated in 5-8 fold excess methanol in a blender, then pressed into films. After drying, 90 g of product was obtained. NMR showed virtually most of the double bond of the polyisoprene had been reacted. IR showed a broad band at 3420 cm$^{-1}$ corresponding to the hydroxyl group. No peaks corresponding to olefinic bonds or carbonyl groups could be found. DSC showed a Tg at 65° C., and TGA showed the onset temperature of decomposition at 380° C. The water permeability at 37.8° C. at 90% humidity was 0.6 and 0.7 gram-mil/100 in$^2$-day. The tensile mechanical properties are: modulus, 161±14 kpsi, maximum strength; 2376±184 psi, the elongation at break; 24±13%.

EXAMPLE 2

Preparation of poly(ethylene-a-α-methyl vinyl alcohol) from trans-polyisoprene with trifluoroacetic acid To 10 g of commercial synthetic trans-polyisoprene in 150 ml toluene was added 34 g of trifluoroacetic acid at 0° to 5° C. over a 30 min. period. Initially the polymer solution started to rise up the stirring rod. The mixture was stirred until it was homogeneous, brown colored. To this was added 45 ml of methanol, which eliminated the color, followed by addition of 30 g of sodium methoxide at 0° C. To this was added 40 ml of acetic acid. The mixture was then washed with methanol (twice with 50 ml) and water-methanol mixture (1:1; twice with 150 ml). The washed polymer was dissolved in a mixture of methanol and methylene chloride (5:95), and then filtered through a sintered glass filter. The polymer was precipitated in methanol. After drying, 8.2 g of product was obtained. NMR showed virtually most of the double bond of the polyisoprene had been reacted. IR showed a broad band at 3420 cm$^{-1}$ corresponding to the hydroxyl group. No peaks corresponding to olefinic bonds or carbonyl groups could be found. DSC showed a Tg at 59° C., and TGA showed the onset temperature of decomposition at 414° C.

When this reaction was carried out at higher temperature, namely above 60° C., the double bond was found to disappear, but no alcohol was found. At these temperatures, the main reaction appears to be cyclization.

EXAMPLE 3

Reaction of trans-polyisoprene with dichloroacetic acid

To 2.0 g commercial synthetic trans-polyisoprene in 120 ml of 1,2-dichloroethane was added 7.5 ml of dichloroacetic acid at 0° C. over a period of 45 min. The mixture was then stirred overnight. The solvent was concentrated under vacuum, diluted with chloroform, and the product precipitated from methanol. The product weighed 2.25 g after drying. The NMR showed a new peak from the proton of dichloroacetate in addition to the peaks due to unreacted polyisoprene. From the intensity ratio, about 13% of the polymer double bond was found to be reacted. IR also showed carbonyl peaks at 1760 and 1740 cm$^{-1}$. Similar results were obtained using toluene as a solvent.

However, in an independent experiment, when 2.0 g of commercial synthetic trans-polyisoprene in 60 ml toluene was reacted with 7.5 ml of dichloroacetic acid under reflux for 8 hr, most of the double bond was found by NMR to be reacted, but only a weak carbonyl peak was found using IR. Under these conditions cyclization seems to be dominating.

EXAMPLE 4

Preparation of poly(ethylene-a-α-methyl vinyl alcohol) by reaction of trans-polyisoprene with trichloroacetic acid To 2.0 g commercial synthetic trans-polyisoprene in 60 ml toluene was added 14.5 g of trichloroacetic acid at 0° C. The mixture was then stirred overnight. The polymer was precipitated from 400 ml of methanol. The polymer was cold pressed into films, and dried. The product weighed 4.11 g. IR showed carbonyl peaks at 1760 cm$^{-1}$. 2.0 g of this polymer was dissolved in a mixture of 80 ml toluene and 20 ml methanol, then 4 g of sodium methoxide was added at 0° C. The mixture was reacted overnight, then 10 ml of acetic acid was added. It was attempted to precipitate the polymer in 800 ml of methanol. The solvent was removed, and dissolved in methylene chloride and then filtered. The filtrate soon formed a gel by standing. The NMR of this product matched the proposed structure.

EXAMPLE 5

Reaction of trifluoroacetic acid with polybutadiene

To 0.5 g of a commercially available polybutadiene (45% vinyl, 55% cis +trans 1,4) in 10 ml toluene was added 10 ml of trifluoroacetic acid. The mixture was stirred for 3 hr at −78° C., then warmed slowly to 0° C. As the temperature reached 0° C., 20 ml of water was added and the polymer was isolated. NMR and IR showed that the double bond of polymer had not reacted at all. A similar reaction was also conducted at room temperature. IR spectrum of the product indicated that no reaction with trifluoroacetic acid occurred.

EXAMPLE 6

Preparation of Polybutadiene-b-poly(ethylene-a-α-methyl vinyl alcohol)

41 g of isoprene was dissolved in 250 ml hexane and placed in a pressure bottle. To this was added 3.85 ml of 3.75 ml of 1.6M hexane solution of n-butyl lithium at 0° C. The mixture was then warmed to 55° C. and reacted for 2 hrs. Butadiene was distilled into at −78° C., and the flask was reheated to 55° C. for two hours. A small fraction of sample was taken at this point and analyzed. NMR showed the ratio between polyisoprene and polybutadiene to be 1 to 1, and GPC showed that Mn=25,000, D=1.35. This mixture was added to 500 ml of toluene, and 137 g of trifluoroacetic acid was added at 0° C. and reacted for 6 hours. To this was added 500 ml of methanol and 70 g of sodium methoxide and the mixture was reacted for 16 hours. The salt formed was removed by washing the mixture with 500 ml, and twice of 100 ml water. The polymer was precipitated from methanol. The weight of polymer was 111 g. The GPC analysis of this product showed that the Mn=31,100, D=1.33, indicating there was no decomposition of the polymer by this chemical process. NMR analysis indicated that more than 80% polyisoprene segment was found reacted, whereas no reaction occurred for the polybutadiene segment.

EXAMPLE 7

Block copolymer of polybutadiene-b-polyisoprene (40:40)

A glass pressure bottle was charged with 200 ml of dry hexane and 34.06 g of isoprene and a small amount of 1,10-phenanthroline, and chilled to 0° C. To this mixture was added 1.6M n-butyl lithium hexane solution until orange color appeared. 7.8 ml of 1.6M hexane solution of n-butyllithium was then added via a syringe, and the mixture was stirred for 16 hr. Then 45 ml of butadiene, which had been treated with 1 ml of n-butyl lithium, was distilled into the reactor. The polymerization was continued for an additional 36 hr. The reaction was terminated by addition of 10 ml of methanol. The solvent was removed and redissolved in a minimum amount of hexane and the polymer was precipitated from methanol. 42.8 g of polymer was obtained. The NMR analysis showed that polybutadiene and polyisoprene segments were 8% and 5% respectively of the 1,2 and 3,4 isomers and the ratio between former to the later was 46 to 54. The GPC showed $Mn=7170$ (expected 5,000) and $D=1.6$. It also showed that there was a small amount of homopolymer of polyisoprene.

EXAMPLE 8

Preparation of Polybutadiene-b-poly(ethylene-a-α-methyl vinyl alcohol) and its monolayer formation on water air interface To 20.4 g of the polymer of Example 7 in 200 ml of toluene was added 20 ml of trifluoroacetic acid at 0° C. in a period of 10 min in two portions. The reaction was stirred for 20 hr at room temperature. To this was added 100 ml of methanol, followed by 27 g of sodium methoxide. At the end of the reaction 35 ml acetic acid in 200 methanol was added. The polymer was not separated at this point. The solvent was removed to about 300 ml, then 50 ml of water was added. This caused formation of an emulsion. 50 more ml of water was added and the organic solvent was allowed to separate overnight. After evaporation of the organic solvent, brittle solid material was obtained. When this polymer was spread on water, using a Langmuir-Blodgett technique, it showed a broad liquid phase before it built up a solid like phase at about 25 mN/m, with the area/repeating unit of the polymer of 1.5 nm². The average thickness of the layer picked up on silicon wafer was about 4.5 nm, after 5 layers of pick up. The water contact of the surface was 67° regardless of the thickness of the film.

EXAMPLE 9

Preparation of Polyethylene-b-poly(ethylene-a-α-methyl vinyl alcohol) and its monolayer formation on water air interface To 8.0 g of the polymer of Example 8 in 160 ml refluxing toluene was added a total of 19.6 g of p-toluenesulfonehydazide (TSH) in three portions in a two hour interval. The mixture was refluxed overnight. The polymer was precipitated from methanol, and repeatedly washed with methanol. The yield was 7.2 g, and NMR confirmed the complete reduction of double bonds. When this polymer was spread on water, using a Langmuir-Blodgett technique, it showed a broad liquid phase before it built up a solid like phase at about 22 mN/m, with area/polymer of 1.5 nm². The average thickness of the layer picked up on a silicon wafer was about 4.8 nm, after 9 layers of pick up. The water contact angle of the surface was 90°, except for the first layer which was 70° C.

EXAMPLE 10

Preparation of Polybutadiene-b-poly(ethylene-a-α-trifluoroacetoxy-β-propene)

Polybutadiene-b-polyisoprene ($Mn=114,000$, $D=1.4$, with a ratio between polybutadiene and polyisoprene segments of 50:4) was prepared by anionic polymerization by sequential addition of monomers. To a 50 ml toluene solution containing 1.0 g of this polymer was added 2.00 ml of trifluoroacetic acid at $-78°$ C. The mixture was then warmed to 0° C. and stirred for 4 hr at this temperature. The acid was removed by washing with 50 ml of s-NaHCO₃ solution, and water. The viscous oil weighed 1.28 g and NMR showed peaks due to the double bond of polybutadiene, but no peak for the double bond of polyisoprene. IR showed a 1778 cm⁻¹ carbonyl peak due to the trifluoroacetate.

EXAMPLE 11

Preparation of Polyethylene-b-poly(ethylene-a-α-methyl vinyl alcohol)

6.0 g of the polymer of Example 10 was reacted in 250 ml of refluxing toluene with 36 g of TSH, which was added in four portions over a period of 8 hrs. The mixture was further refluxed for additional 16 hr. The reaction mixture was washed with 50 ml of 4M sodium hydroxide solution, but formed an emulsion. To this was added 100 ml of water. The mixture was then centrifuged at 13,000 rpm for 15 hr at 13°-20° C. The top layer was carefully removed and the remainder centrifuged again. The precipitate was filtered, and the organic layer was treated with 150 ml methanol for 16 hr and more precipitate was obtained. A total of 6.68 g of slightly brown colored material was obtained. NMR showed complete removal of double bond.

EXAMPLE 12

Preparation of Polybutadiene-r-poly(ethylene-a-α-trifluoroacetoxy-β-propene)

A random copolymer of polybutadiene and polyisoprene ($Mn=229,000$, $D=2.9$. butadiene/isoprene=10:1) was prepared by an anionic polymerization mode by adding 1.6M n-butyl lithium solution into a mixture of isoprene and butadiene in hexane. To 10.0 g of this polymer in 200 ml of toluene was added 20 ml of trifluoroacetic acid at $-78°$ C. The mixture was then warmed to 0° C. Some portion of polymer had precipitated at low temperature and did not dissolve into the solution when it was warmed 0° C. These lumps were removed from the reaction mixture. After 4 hr at 0° C., the trifluoroacetic acid was removed by washing with a NaOH solution and water. NMR and IR confirmed the complete reaction of the polyisoprene segment to trifluoroacetate.

EXAMPLE 13

Preparation of
Polyethylene-r-poly(ethylene-a-α-methyl vinyl alcohol)

6.0 of the polymer of Example 12 was reacted in 250 ml of refluxing toluene with 36 g of p-toluenesufonhydrazide, which was added in four poritons over a period of 8 hrs. The mixture was further refluxed for additional 16 hr. The reaction mixture was washed with 50 ml of 4M sodium hydroxide solution, which was separated well from the organic layer. With addition of water an emulsion was formed which could be removed only after centrifuging the mixture at 13,000 rpm for 15 hr. at 13°-20° C. White solid material settled to the bottom. The organic layer was removed and treated with 150 ml methanol for 16 hr. 3.96 g of slightly brown colored material was obtained. NMR showed complete removal of double bonds.

EXAMPLE 14

Reaction of trifluoroacetic acid with oligomeric polyisoprene-b-poly(t-butyl methacrylate) to give poly(ethylene-a-α-trifluoroacetoxy-β-propene)-b-polymethacrylic acid In an oven dried resin kettle was placed 300 ml n-hexane and 45.4 ml of 1.1M s-butyl lithium. To this was added 34 g of isoprene over a period of 20 min. and the mixture was reacted for 2.5 hr at room temperature. 50 ml of tetrahydrofuran followed by 14 g of t-butyl methacrylate was added in a period of 10 min. It was stirred for 16 hr, then 10 ml of methanol was added. The solvent was removed under reduced pressure, and the methylene chloride soluble fraction was recovered, and dried under vacuum. a total of 42 g of polyisoprene-b-poly(t-butyl methacrylate) was obtained. IR showed a strong carbonyl band at 1720 cm$^{-1}$. 1.0 g of the above polyisoprene-b-poly(t-butyl methacrylate) was treated with 10 ml of trifluoroacetic acid in 10 ml toluene for 24 hr. NMR indicated complete removal of double bonds. IR showed that the peaks corresponding to vinyl groups had disappeared and a new peak at 1778 cm$^{-1}$, which is due to the carbonyl of trifluoroacetate, appeared. The carbonyl peak (1720 cm$^{-1}$) from the poly(t-butyl methacrylate) had also disappeared and a new carbonyl peak due to carboxylic acid appeared at around 1700 cm$^{-1}$ indicating the resulting product was a block copolymer containing polymethacrylic acid.

EXAMPLE 15

Reaction of trifluoroacetic acid with polymeric polyisoprene-b-poly(t-butyl methacrylate) to give poly(ethylene-a-α-trifluoroacetoxy-β-propene)-b-polymethacrylic acid To 0.5 g of an anionically polymerized polyisoprene-b-poly(t-butyl methacrylate) (Mn=356,000, D=2.0) in 10 ml of toluene, which had been stirred for 20 hr for complete dissolution, was added 10 ml of trifluoroacetic acid. The mixture was stirred for 3 hr at −78° C., then warmed slowly to 0° C. As the temperature reached 0° C., 20 ml of water was added and the polymer was precipitated. The precipitate was redissolved in a mixture of methanol and toluene and the solvent was evaporated under vacuum. The polymer weighed 0.6 g. NMR showed complete disappearance of double bonds. IR showed disappearance of vinyl peaks and appearance of a new peak at 1778 cm$^{-1}$, due to the carbonyl of trifluoroacetate. A similar reaction was also conducted at room temperature, and the same conclusions were drawn from IR of the product.

EXAMPLE 16

Reaction of trifluoroacetic acid with oligomeric polyisoprene-b-poly(t-butyl methacrylate) followed by saponification to convert to poly(ethylene-a-α-methyl vinyl alcohol)-b-polymethacrylic acid 1.0 g of anionically polymerized polyisoprene-b-poly(t-butyl methacrylate) (Mn=7140, D=1.3) having a ratio of isoprene to t-butyl methacrylate of 40:2, was dissolved in 10 ml of hexane, then chilled to −78° C. To this was added 2.0 ml of trifluoroacetic acid and the mixture was warmed to 0° C. slowly. The mixture was stirred for 2.5 hr at 0° C., during which orange color developed. The reaction was quenched with 10 ml water. The organic layer was washed with water and NaHCO$_3$ solution, then the hexane was removed. The polymer was dissolved in 5 ml toluene and 5 ml of methanol (MeOH), and 5 ml of 1N NaOH was added. The mixture was stirred at room temperature for 18 hr. After the toluene was removed, the polymer was dissolved in MeOH and insolubles filtered off. The solvent was removed under vacuum. IR showed no peaks at 1778 cm$^{-1}$, indicating successful saponification. NMR also identified the product. When the polymer was isolated before the saponification, a crispy brown material was obtained, whereas the saponified product was a sticky solid.

EXAMPLE 17

Monolayer formation of the polymer of Example 16

6.9 mg of the polymer of Example 16 was dissolved in 1 ml of MeOH and 2 ml of CHCl$_3$, then spread on water. Using a Langmuir-Blodgett technique, the area/repeating unit of polymer was determined to be 0.18 nm$^2$, and the collapse pressure was found to be about 22 mN/m. No hysterisis was observed up to this pressure at the pressure area isotherm. When the film was deposited on the silicon wafer, it showed z-type of deposition with the thickness of each layer to be about 0.8 nm. Deposition up to 10 layers gave a linear relation between the layer and the total thickness.

EXAMPLE 18

Preparation of Polystyrene-b-poly(ethylene-a-α-methyl vinyl alcohol)

To block copolymer of about 1:1 styrene and isoprene prepared by anionic polymerization of sequential monomer addition, in 100 ml of toluene was added 6.0 ml of trifluoroacetic acid at 0° C. The mixture was stirred for 6 hr at 0° C. To this was added 50 ml of MeOH followed by 4.63 g of sodium methoxide. The solution was warmed to room temperature and stirred for 16 hr., and 6 ml of acetic acid was added at 0° C. The polymer was precipitated from methanol, redissolved in methylene chloride, and reprecipitated from methanol. The yield was 4.34 g, and spectroscopic analysis supported the modification.

EXAMPLE 19

Synthesis of triblock copolymer of poly(ethylene-a-α-methyl vinylalcohol)-b-polybutadiene-b-poly(ethylene-a-α-methyl vinylalcohol) and thin film formation To 300 ml of hexane solution in a thick-walled glass bottle containing 6 ml of purified isoprene was added 260 μl of 1.6N n-butyl lithium solution in hexane at room temperature under argon. This mixture was heated at 50° C. for 3 hr, then cooled to room temperature. To this was distilled 25 ml of butadiene, then the mixture was heated to 50° C. again. A mild exotherm was observed in 30 to 35 min. After 2 hr, 6 ml more isoprene was added at room temperature, and the reaction was allowed to precede another 4.5 hr. This gives theoretically a polymer of polyisoprene-b-polybutadiene-b-polyisoprene with the degree of polymerization of each polyisoprene segment as 300 and the polybutadiene segment as 1500. The polymer solution was taken out of the reactor, and 300 ml of toluene was added. The solvent was concentrated under reduced pressure to leave about 300 ml of polymer solution. To this was added 50 ml of trifluoroacetic acid at 0° C. under nitrogen. The mixture was stirred for 6 hr. Then 60 ml more trifluoroacetic acid was added and the mixture stirred for one more hr. To this was added 254 ml of 25% sodium methoxide solution in methanol at 0° C., and the mixture was stirred for 17 hr at room temperature. In a few hours, a pasty slurry was obtained. 500 ml of MeOH was added with easy stirring. After 2 days, 69 ml of acetic acid was added, and the polymer was precipitated from methanol. A total of 30.24 g of cream colored rubbery material was obtained after drying. Proton NMR indicated almost complete transformation of the polyisoprene segments, whereas the polybutadiene segment was intact. This polymer was dissolved in 30% methanol in chloroform to make a concentration of 1.5 mg/ml. This solution was spread on water and compressed to form a thin film. When the thin film was deposited on a silicon wafer at 29 mN/m, the first layer was 7.5 nm.

EXAMPLE 20

Synthesis of triblock copolymer of poly(ethylene-a-α-methyl vinylalcohol)-b-polybutadiene-b-poly(ethylene-a-α-methyl vinylalcohol) its mechanical properties To 300 ml of hexane solution in a thick-walled glass bottle containing 6 ml of purified isoprene was added 360 μl of 1.6 N n-butyl lithium solution in hexane at room temperature under argon. This mixture was heated at 50° C. for 2 hr, then cooled to −78° C. To this was distilled 34 ml of butadiene at −78° C., then the mixture was heated to 50° C. again. After 4 hr, 6 ml more isoprene was added at room temperature, and the reaction was allowed to precede another 16 hr. This gives theoretically a polymer of polyisoprene-b-polybutadiene-b-polyisoprene with the degree of polymerization of each polyisoprene segment as 150 and the polybutadiene segment as 1000. The polymer solution was taken out of the reactor, then 500 ml of toluene was added. To this was added 78.5 ml of trifluoroacetic acid at 0° C. under nitrogen, and the mixture was stirred for 6 hr. Then 60 ml more trifluoroacetic acid was added and the mixture stirred for one more hr. To this was added 500 ml of methanol, followed by 15.56 g of sodium methoxide, and the mixture was stirred for 16 hr at room temperature under nitrogen. The reaction was quenched with 500 ml of water. The organic layer was washed twice with water, then the polymer was precipitated from methanol. A total of 34.36 g of polymer was obtained. TEM showed that there was 30 to 100 nm spherical domains of hydroxylated polyisoprene phase, whereas polybutadiene was a continuous phase. The tensile properties of this polymer were as follows: strength at max; 152±20 psi, elongation at break; 66±25%, modulus and modulus 0.39 ±027 kpsi.)

EXAMPLE 21

Reaction of isoprene with deutrated trifluoroacetic acid

To 10 ml of deutrated toluene containing 1 ml of isoprene was added 1 ml if trifluprpacetic acid at −78° C. The mixture was then warmed to room temperature. Reaction of the acid with the 3,4 double bond could be observed by proton NMR. The reaction was carried out for 16 hr, then 10 ml of D2O was added. Gas chromatography/mass spectroscopy analysis of this mixture showed that the major component of this liquid was fully deutrated 1,1-dimethyl allyl alcohol.

EXAMPLE 22

Reaction of (R)-(−)-carvone with trifluoroacetic acid

To 3.0 g of (R)-(−)-carvone in 50 ml of methylene chloride was added 9.2 ml of trifluoroacetic acid. The mixture was then heated under reflux for 2 hrs. To this was added water, and the organic layer was separated and washed with NaHCO3 solution and water. After drying, 3.04 g of product was obtained. NMR analysis showed that it consisted of 20% of the starting material and 70% of the hydroxylated product. The proton NMR exhibited a doublet for the diastereotopic methyl groups of the isopropyl group at 1.6 ppm, and the tertiary carbon attached to newly formed hydroxyl group showed a peak at 89.2 ppm in carbon NMR. During the aqueous workup, about 10% of the ester was cleaved to give the corresponding alcohol, which showed the diastereotopic isopropyl group at 1.21 ppm in proton NMR, and the tertiary carbon at 71.3 ppm in carbon NMR.

What is claimed is:

1. An adduct generated by reacting a halogenated $C_1$ to $C_5$ carboxylic acid having a pka of less than 2.5 with a compound having the following repeating unit of formula (I)

wherein $R^1$ is alkyl or cyclic alkyl and n is two or more, in the absence of a catalyst to yield an adduct comprising the following repeating unit of formula (II)

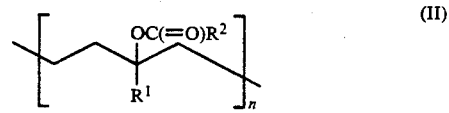

wherein $R^1$ and n are as defined above, and $R^2$ is $C_1$ to $C_4$ haloalkyl, 2. A compound comprising the following repeating unit of formula (II):

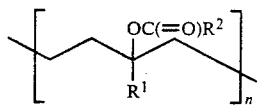 (II)

wherein
R¹ is alkyl or cyclic alkyl;
R² is $C_1$ to $C_4$ haloalkyl; and
n is two or more.

3. A compound of claim 2 wherein R² is a chloroalkyl or fluoroalkyl group.

4. A compound of claim 2 comprising poly(ethylene-a-α-haloacetoxy-β-propene).

5. A block or random copolymer comprising one or more repeating units of claim 2 and at least one of polyethylene, polybutadiene, polystyrene, polyacrylate or polymethacrylate.

6. A copolymer of claim 5 comprising polybutadiene-b-poly(ethylene-a-α-trifluoroacetoxy-βpropene).

7. A copolymer of claim 5 comprising polybutadiene-r-poly(ethylene-a-α-trifluoroacetoxy-β-propene).

8. A copolymer of claim 5 comprising poly(ethylene-a-α-trifluoroacetoxy-β-propene)-b-polyacrylic acid.

9. A compound generated by the saponification of a compound of claim 2.

10. A compound of claim 2 saponified to yield a regularly alternating polymer comprising repeating units of poly(ethylene-a-α-methyl vinyl alcohol).

11. A compound of claim 9 in the form of a thin film made and deposited at a water/air interface.

12. A block or random copolymer comprising repeating units of a compound of claim 9 with at least one of polybutadiene, polyethylene, polyisoprene, polystyrene, polymethacrylic acid or polyacrylic acid.

13. A copolymer of claim 12 comprising polybutadiene-b-poly(ethylene-a-α-methyl vinyl alcohol).

14. A copolymer of claim 12 comprising polyethylene-b-poly(ethylene-a-α-methyl vinyl alcohol).

15. A copolymer of claim 12 comprising polyethylene-r-poly(ethylene-a-α-methyl vinyl alcohol).

16. A polymer of claim 12 comprising poly(ethylene-a-α-methyl vinyl alcohol)-b-polyacrylic acid.

17. A copolymer of claim 27 in the form of a thin film made and deposited at a water/air interface.

18. A copolymer comprising poly(ethylene-a-α-methyl vinyl alcohol)-b-polybutadiene-b-poly(ethylene-a-α-methyl vinyl alcohol.

19. A compound of claim 9 comprising poly(ethylene-a-α-methyl vinyl alcohol).

* * * * *

UNITED STATES PATENT AND TRADEMARK OFFICE
CERTIFICATE OF CORRECTION

| | |
|---|---|
| PATENT NO. : | 5,216,072 |
| DATED : | JUNE 1, 1993 |
| INVENTOR(S) : | YOUNG H. KIM |

It is certified that error appears in the above-identified patent and that said Letters Patent is hereby corrected as shown below:

Column 2, at lines 55-60, delete the existing chemical structure and insert in its place the following:

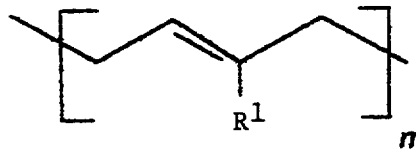

Column 14, lines 51-55, delete the existing chemical structure and insert in its place the following:

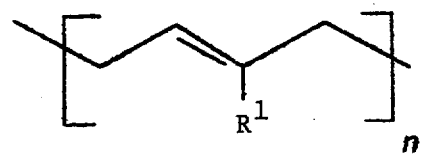

Signed and Sealed this

Twenty-fourth Day of January, 1995

Attest:

BRUCE LEHMAN

Attesting Officer     Commissioner of Patents and Trademarks